Patented June 15, 1954

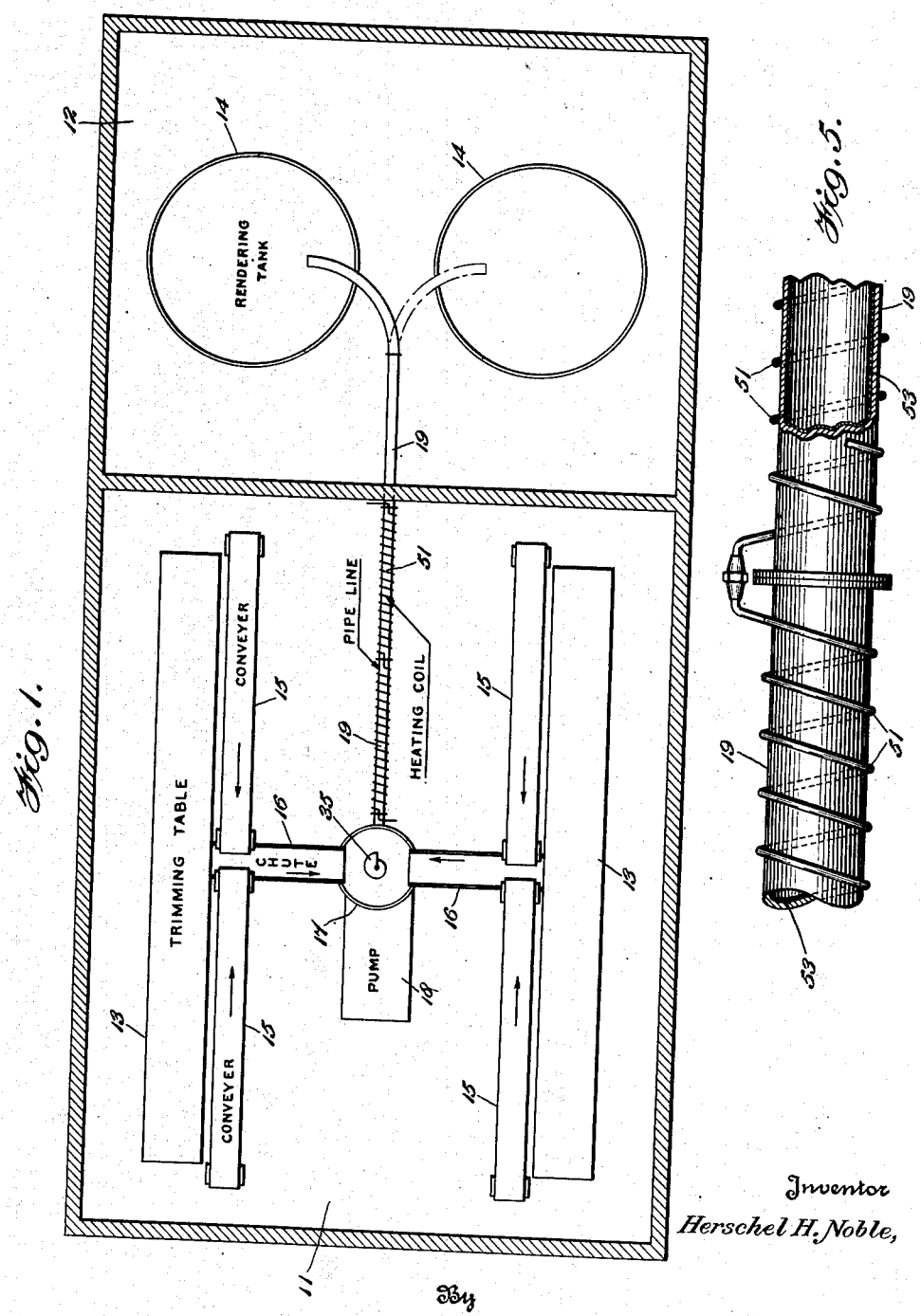

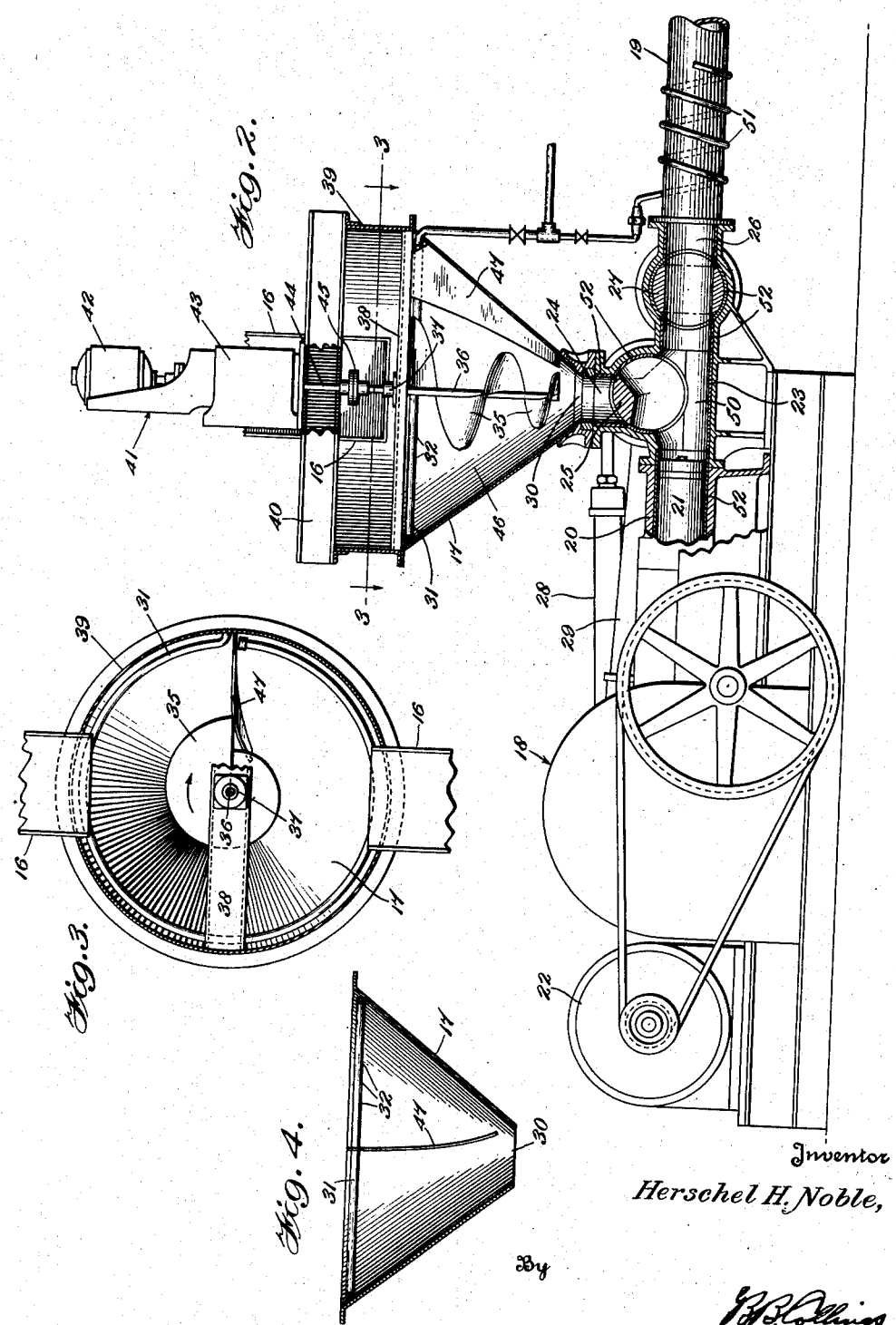

2,681,270

UNITED STATES PATENT OFFICE 2,681,270

TRANSFER OF SLABS AND STRIPS OF RAW ANIMAL FAT MATERIAL IN MEAT PROCESSING PLANTS AND THE LIKE

Herschel H. Noble, Cincinnati, Ohio, assignor to E. Kahn's Sons Company, Cincinnati, Ohio, a corporation of Ohio Application October 30, 1950, Serial No. 192,920

13 Claims. (Cl. 23—280)

The invention relates generally to the transfer of fatty portions of animal carcasses from one work station to another in a butchering or similar plant where such carcasses are processed into food for human consumption, and a typical example thereof may be found in the transfer of slabs, strips and smaller pieces of hog, beef or mutton fat from the trimming tables in the cutting room of such a plant to the rendering tanks for conversion into lard, tallow, etc.

In such operations, in order to prevent spoilage of the products, it is customary to carry on the trimming in a room in which the temperature is maintained at about 45° F. On the other hand, the rendering operation calls for much higher temperatures, and thus the cutting and rendering ordinarily are performed in different rooms, usually located at some distance from one another and in some instances even in different buildings. Under these conditions the usual practice has been for the trimmers to deposit the slabs, strips and smaller pieces of fat, as they are severed from the meaty portions of the carcasses at the trimming tables, into wheeled carts which, when filled, are manually pushed from the cutting room to the rendering room and their contents deposited into the rendering tanks.

It is the primary object of the present invention to provide a method and apparatus for effecting the transfer of materials of the character indicated from one work station to another located at a distance therefrom, in a continuous, more expeditious and sanitary manner, with complete elimination of the aforementioned push carts and the manual labor incident to their use.

Extensive experiments conducted with full-scale apparatus have demonstrated the complete feasibility of mechanically pumping pieces, strips and slabs of hog fat up to at least two feet in length, one foot in width and two inches in thickness, through a pipe-line of from six to eight inches in diameter, for distances of several hundred feet. In such installation the pump is of the horizontal cylinder, single-acting reciprocating piston type, with the cylinder having a diameter substantially the same as that of the pipe-line, and the inlet and outlet valves controlling the passages leading to and from the cylinder being of the positively actuated oscillating plug type which, when open, provide unobstructed passageways of like diameter. The pump is surmounted by an inverted conical feed hopper, the throat or lower end of which communicates with the inlet passage of the pump; and the strips, slabs and smaller pieces of fatty material are deposited into the open upper end of the hopper by suitable conveying devices extending thereto from the several trimming tables in the cutting room. The pipe-line extends from the outlet of the pump to the rendering room, where it is arranged to discharge into one or more rendering tanks.

Since the fatty material is of such character that it will not freely move by gravity from the conical hopper through the inlet passage and valve of the pump, even on the suction stroke of the pump piston, means are provided in the hopper for pressurally advancing the fat into the valve chamber and pump cylinder when the inlet valve is open. Furthermore, since at the temperature of approximately 45° F. at which the fatty material is deposited in the hopper the said material has a tendency to stick to the hopper walls, the latter preferably are heated and/or lubricated by a spray of hot water or steam discharged on their inner surfaces from an annular spray pipe extending around the upper portion of the hopper. Also, the pipe-line extending from the pump to the rendering tanks preferably is provided with means, such as a helical steam or hot water pipe encircling at least that portion of it lying within the relatively cold cutting room, whereby the pipe walls may be heated somewhat at the beginning of a pumping operation, and at other times if necessary or desirable.

For purposes of disclosure the essential features of an installation such as that above mentioned are illustrated in the accompanying drawings forming part of this specification, in which like reference characters designate like parts throughout the views, and in which:

Figure 1 is a diagrammatic sectional-plan view of a typical installation in accordance with the invention;

Fig. 2 is a longitudinal vertical sectional view, partly in side elevation, of the pump and the feeding mechanism therefor;

Fig. 3 is a horizontal sectional-plan view of said feeding mechanism, on approximately the plane indicated by the line 3—3 in Fig. 2, looking down;

Fig. 4 is a central vertical sectional view of the feed hopper, taken on a plane at right angles to that of Fig. 2; and Fig. 5 is a detail elevational view, partly in section, of a portion of the pipe-line.

Referring more particularly to Fig. 1, there is diagrammatically illustrated a cutting room 11 and a rendering room 12, which rooms, although here indicated as adjacent, may be and frequently are located at a considerable distance from one another. The cutting room houses a plurality of appropriately disposed trimming tables 13, on which the operation of trimming away the fatty portions of the carcasses is performed; and one or more rendering tanks 14 are located in the rendering room.

Power driven conveyers 15 are mounted adjacent the trimming tables, upon which the severed slabs, strips and smaller pieces of fatty material may be deposited by the trimmers 16 which transfer to inclined chutes or troughs 16 which are arranged to discharge into the open-topped conical hopper 17 which surmounts and communicates with the intake of a pressure pump 18, described in greater detail below. The outlet of said pump communicates with a pipe-line 19 made up of readily-detachable sections, which line extends from the cutting room 11 to and into the rendering room 12, where it is arranged to discharge into the rendering tanks 14.

The details of the pump 18, its feed hopper 17, and associated mechanism are best shown in Figs. 2, 3 and 4. The pump here shown is a somewhat modified version of one heretofore developed and widely used for the pumping of plastic concrete mixtures, as disclosed in prior U. S. Patents Nos. 2,017,975 and 2,062,200. The modifications in such pumps whereby to adapt them to the present purpose, reside essentially in elimination of the abnormal circumferential clearances provided between the oscillating valve plugs and their housings for the handling of concrete; and adjustment of the valve actuating mechanism so that the valves will close completely rather than only partially, as is customary in concrete practice.

Briefly, such pumps comprise a cylinder 20 providing a working chamber in which a single-acting piston 21 is reciprocally mounted, such piston being driven by an electric or other motor 22 through transmission mechanism fully disclosed in said prior patents but not here important. The diameter of the working chamber 20 ranges from six to eight inches, dependent upon the rated capacity of the pump, and at its forward end said chamber communicates with a valve housing 23 having an inlet passage 24 controlled by an oscillating plug valve 25, and an outlet passage 26 controlled by an oscillating plug valve 27. The pipe-line 19 is connected to said outlet passage 26, and the valve plugs 25 and 27 are positively moved in each direction by cam-actuated valve rods 28 and 29 respectively, such valve movements of course being in properly timed relation to each other and to the reciprocations of the piston 21. The passages 24 and 26 of the valve housing 23, as well as those in the valve plugs 25 and 27, and the pipe-line 19, are all of substantially the same diameter as the working chamber 20 of the pump, although except from the standpoint of the working capacity of the system, this feature is not of as much importance in the pumping of the present animal fat material as it is in the handling of concrete, because this fatty material is compressible, and does not possess the peculiar "stowing" property of concrete.

As will be clear from Fig. 2, the inverted conical hopper 17 surmounts the valve housing 23 of the pump, and the discharge port 30 in its lower end communicates with the inlet passage 24 of the latter. As above indicated, the slabs, strips and other pieces of fatty material can not be satisfactorily fed from the hopper into said inlet passage 24 by gravity alone, at least not in quantities sufficient to enable the pump to operate at maximum capacity. This is due in part to the fact that at the temperature of around 45° F. at which the material is supplied to the hopper it is quite sticky and tends to adhere to the hopper walls; and in part to the fact that there are numerous air-containing spaces between the pieces of material making up the mass in the hopper, whereby in the absence of some means for preventing it, the suction stroke of the piston 21 will draw air into the working chamber 20 in large quantities, if not exclusively.

The first of the above mentioned difficulties is overcome in the present apparatus by the provision of an annular pipe 31 extending around the upper interior portion of the hopper 17 and provided with downwardly directed perforations 32, through which hot water or steam may be sprayed on the inner surfaces of the hopper walls. This not only heats the said walls somewhat, but the water or condensed steam serves as a lubricant thereon which prevents any substantial adherence of the fatty pieces to such surfaces.

The second difficulty referred to above is obviated through the provision of mechanical devices in the hopper 17 which substantially eliminate the air pockets from the fatty mass by the time it reaches the inlet passage 24, and positively force the deaerated material through such passage and the inlet valve 25, when open, so that the working chamber of the pump is substantially completely filled with such material on each suction stroke of the piston, whereby the pump may function at maximum efficiency. These feeding and deaerating devices comprise a screw or helical flight 35 carried by a vertical shaft 36 disposed axially of the hopper, as will be clear from Figs. 2 and 3, and journalled in a bearing 37 carried by a bridge member 38 which in turn is carried by an annular extension element 39 surmounting and secured to the hopper. As shown in these figures, the feed chutes 16 may extend through this annulus 39 to discharge into the hopper; and said extension is surmounted by transverse beams or supporting members 40 upon which is mounted a driving unit 41 for the screw 35. As here illustrated, this unit comprises an electric motor 42 coupled to a speed reducing mechanism 43, the output shaft 44 of which is connected to the screw shaft 36 by a shaft coupling 45.

The helical flight or screw 35 is of smaller diameter than the hopper 17, and is of the tapering variety, although its taper is less than that of the conical hopper, as shown in Fig. 2. There is thus provided a downwardly tapering space 46 between the periphery of the helical flight and the hopper wall, at one point in which there is disposed a generally vertical, slightly curved blade 47 fixedly secured to and extending radially inwardly from said hopper wall throughout substantially the entire height of the latter. With the helical flight or screw 35 rotating in a clockwise direction as indicated by the arrow in Fig. 3, it tends to work the slabs, strips and smaller pieces of fatty material introduced into the hopper from the chutes 16, downwardly toward the throat at the bottom of the hopper and into the inlet passage 24 of the valve housing 23. During the periods when the inlet valve 25 is closed, as shown in Fig. 2, the flight 35 works or kneads and partially disintegrates the pieces of fat, substantially eliminating all air pockets in the mass and especially the lower portion thereof; and when said inlet valve opens the screw action positively forces the material, substantially devoid of air, through the valve passage and into the chamber 50 of the valve housing 23, from whence it is drawn into the working chamber 20 of the pump by the then receding piston 21. Upon the working stroke of the piston, when the valve 25 is again closed and the outlet valve 27 is open, the mass in the cylinder 20 is forced forwardly to and through said valve 27, outlet passage 26, and pipe-line 19, to be ultimately discharged into the rendering tank 14. With the pump operating at its normal speed of from 45 to 50 strokes per minute, the discharge into the tank 14 will be in a compacted substantially continuous although pulsating stream.

The fixed blade 47 in the hopper prevents the mass of fatty material rotating therein as a whole, under the turning influence of the helical flight 35; and said blade also assists in the "hashing" or partial disintegrating action of the flight, as well as the forcing or directing of the material into the inlet passage of the pump. The hashing and working of the fatty material in the hopper by the flight 35 and blade 47 tends to at least partly emulsify the fat and the water or condensed steam from the pipe 31; and the disintegration of the material is carried on by the valves 25 and 27, since each segment of each valve cuts completely through the stream of material passing through such valve at each closing thereof. These several actions of the flight 35, blade 47, and pump valves 25 and 27 all contribute some beneficial effect to the material as regards the rendering operation carried on in the tanks 14.

The speed of rotation of the helical flight 35 will depend, at least to some extent, upon the pitch of the helix and its diameter relative to that of the hopper; however, in the experimental installation mentioned above good results have been attained when the flight is rotated at about one revolution or a little more for each working stroke of the pump piston 21.

At the temperature of about 45° F. commonly prevailing in the cutting room 11 it is desirable or even sometimes necessary, at the start of a pumping operation and/or at other times, to heat the pipe-line 19 to a somewhat higher temperature to facilitate the passage of the compressed fatty material through it. For this purpose, at least that portion of the line lying within the cutting room is surrounded by a coil 51 of copper tubing or the like, through which hot water or steam may be passed from any suitable source. Of course, the entire line may be so equipped and heated, if necessary.

For the handling of concrete mixtures the working chamber 20 of pumps of this type, as well as the chamber 50 and several passages of the valve housing 23, are customarily provided with replaceable hardened liners 52 designed to withstand the abrasive action of the material being pumped. The fatty material with which the present invention is concerned of course presents no such problem of abrasive wear, but since it is subject to contamination and/or spoilage through contact with certain metals, for the instant purpose such liners may be formed of stainless steel or the like. For similar reasons the interior surface of the pipe-line 19 preferably is tinned, galvanized, enameled or otherwise appropriately coated, as indicated at 53 in Fig. 5.

What is claimed is:

1. In a meat processing plant having a work station comprising a trimming table at which fatty portions of the animal carcasses are severed from other portions thereof, and a second work station located at a substantial distance from said first station and comprising receptacles in which said fatty portions are further processed, the combination therewith of a pressure pump disposed at said first work station and having an inlet and an outlet; an open hopper adjacent the pump, having a discharge port communicating with said pump inlet; conveyer means extending between the trimming table and said hopper, for transferring the severed slabs, strips and smaller fatty portions of the carcasses from said table to the hopper; feeding means in the hopper for forcing said fatty portions through the hopper discharge port and into the pump; means for continuously actuating said pump and said feeding means; and a pipe-line connected to and extending from the outlet of the pump to the receptacle at said second work station, for conducting the fatty material pressurally moved by the pump to said receptacle in a compacted continuous stream.

2. In a meat processing plant having a work station provided with trimming tables at which fatty portions of the animal carcasses are severed from other portions thereof, and a second work station located at a substantial distance from said first station and comprising receptacles in which said fatty portions are further processed, the combination therewith of a pump disposed at the first mentioned work station and having a working chamber, an inlet passage and an outlet passage each communicating with said chamber, a pressure member operable in the chamber, and means for continuously actuating said pressure member; an inverted coniform hopper surmounting the pump and having a discharge port at its lower end communicating with said inlet passage of the pump; conveyer means extending from the trimming tables to said hopper, for transferring the severed slabs, strips and smaller fatty portions of the carcasses from said tables to the hopper; a vertical axially-disposed feeding screw mounted in the hopper, for forcing said fatty portions through the hopper discharge port and pump inlet passage to the working chamber of the pump; means for continuously actuating said feeding screw; and a pipe-line connected to and extending from the outlet passage of the pump to the receptacles at said second work station, for conducting the fatty material pressurally moved by the pump to said receptacles in a compacted continuous stream.

3. In a meat processing plant a work station comprising trimming tables at which fatty portions of the animal carcasses are severed from other portions thereof, a second work station spaced a substantial distance from said first station and comprising receptacles in which said fatty portions are further processed, a pressure pump disposed at the first mentioned work station and having an inlet and an outlet; an open hopper adjacent said pump, having a discharge port communicating with said pump inlet; conveyer means extending between the trimming tables and said hopper, for transferring the severed slabs, strips and smaller fatty portions of the carcasses from said tables to the hopper; feeding means in the hopper for forcing said fatty portions through said discharge port thereof and into the pump; means for continuously actuating said pump and said feeding means; means for supplying a heating fluid to the walls of said hopper, to facilitate the passage of the fatty material through the hopper; and a pipe-line connected to and extending from the outlet of the pump to the receptacles at said second work station, for conducting the fatty material pressurally moved by the pump to said receptacles in a continuous compacted stream.

4. In a meat processing plant a work station comprising trimming tables at which slabs, strips and smaller portions of fatty material are severed from other parts of the animal carcasses, a second work station spaced a substantial distance from the first mentioned station and comprising receptacles in which said fatty material is further processed, a pressure pump disposed at said first work station and having an inlet and an outlet; an open hopper surmounting the pump and having a discharge port communicating with said inlet of the latter; conveyer means extending between said trimming tables and hopper, for transferring the severed slabs, strips and smaller fatty portions of the carcasses from the tables to the hopper; feeding means in the hopper for forcing said fatty portions through said discharge port thereof and into the pump; means for continuously actuating said pump and said feeding means; means in the hopper for discharging a lubricating fluid to the inner surfaces of the hopper walls, to facilitate the passage of the fatty material through the hopper; and a pipe-line connected to and extending from the outlet of the pump to the receptacles at said second work station, for conducting the fatty material pressurally moved by the pump to said receptacles in a compacted continuous stream.

5. In a meat processing plant having a low temperature work station provided with trimming tables at which fatty portions of the animal carcasses are severed from other portions thereof, and a second work station spaced a substantial distance from the first mentioned station and comprising receptacles in which said fatty portions are further processed at higher temperatures, the combination therewith of a pressure pump disposed at said first work station and having an inlet and an outlet; an open hopper adjacent the pump, having a discharge port communicating with said inlet thereof; conveyer means extending between the trimming tables and said hopper, for transferring the severed slabs, strips and smaller fatty portions of the carcasses from said tables to the hopper; feeding means in the hopper for forcing said fatty portions through the discharge port thereof and into the pump; means for continuously actuating said pump and said feeding means; a pipe-line connected to and extending from the outlet of the pump to the receptacles at said second work station, for conducting the fatty material pressurally moved by the pump to said receptacles in a compacted continuous stream; and means for supplying heat to the walls of at least that portion of the pipe-line which is disposed in the low temperature zone of said work station, whereby to facilitate passage of the pumped material through said line.

6. Apparatus for pressurally transferring slabs, strips and smaller pieces of animal fat material in a continuous confined stream from one work station of a meat processing plant to another work station substantially spatially separated from the first mentioned station, said apparatus comprising a pump disposed at the first mentioned work station and having a working chamber, a pressure member operable therein, and inlet and outlet passages communicating with said chamber; an inverted conical hopper surmounting said pump for continuously receiving the slabs, strips and smaller pieces of fatty material, the lower end of said hopper communicating with said inlet passage of the pump; means in said hopper for working the mass of fatty pieces therein to substantially eliminate air therefrom and forcing the material through said inlet passage to the working chamber of the pump as a compacted substantially deaerated mass, comprising a helical flight of substantially less diameter than the hopper rotatably mounted co-axially therein; means for continuously rotating said helical flight in such direction as to move the fatty material toward said inlet passage; and a closed conduit connected to and extending from the outlet passage of the pump to the second work station.

7. Apparatus for pressurally transferring slabs, strips and smaller pieces of animal fat material in a continuous confined stream from one work station of a meat processing plant to another work station substantially spatially separated from the first mentioned station, said apparatus comprising a pump disposed at the first mentioned work station and having a working chamber, a pressure member operable therein, and inlet and outlet passages communicating with said chamber; an inverted conical hopper surmounting said pump for continuously indiscriminately receiving the slabs, strips and smaller pieces of fatty material, the lower end of said hopper communicating with said inlet passage of the pump; means in said hopper for working the mass of fatty pieces therein to substantially eliminate air therefrom and forcing the material through said inlet passage to the working chamber of the pump, comprising a longitudinally tapering helical flight of less diameter than the hopper rotatably mounted co-axially in the latter, the taper of said flight being uniform from one end to the other and in the same direction as but less than that of the hopper; means for continuously rotating said helical flight in such direction as to move the fatty material toward said inlet passage; and a closed conduit connected to and extending from the outlet passage of the pump to the second work station.

8. Apparatus for pressurally transferring slabs, strips and smaller pieces of animal fat material in a continuous confined stream from one work station of a meat processing plant to another work station substantially spatially separated from the first mentioned station, said apparatus comprising a pump disposed at the first mentioned work station and having a working chamber, a pressure member operable therein, and inlet and outlet passages communicating with said chamber; an inverted conical hopper surmounting said pump for continuously indiscriminately receiving the slabs, strips and smaller pieces of fatty material, the lower end of said hopper communicating with said inlet passage of the pump; means in said hopper for working the mass of fatty pieces therein to substantially eliminate air therefrom, and forcing the material through said inlet passage to the working chamber of the pump as a compacted substantially deaerated mass, comprising a helical flight of substantially less diameter than the hopper rotatably co-axially mounted in the latter; a vertically extending blade carried by the hopper and extending inwardly from its wall toward said flight, for preventing rotation of the mass of fatty material relative to the hopper, and assist- in the deaerating and feeding operations of the flight; means for continuously rotating said helical flight in such direction as to move the fatty material toward said inlet passage; and a closed conduit connected to and extending from the outlet passage of the pump to the second work station.

9. Apparatus for pressurally transferring slabs, strips and smaller pieces of animal fat material in a continuous confined stream from one work station of a meat processing plant to another work station substantially spatially separated from the first mentioned station, said apparatus comprising a pump disposed at the first mentioned work station and having a working chamber, a pressure member operable therein, inlet and outlet passages communicating with said chamber, and positively actuated valve means controlling said passages; an inverted conical hopper surmounting said pump for continuously receiving the pieces of fatty material, the lower end of said hopper communicating with said inlet passage of the pump; a helical flight of less diameter than the hopper rotatably mounted in the latter co-axially thereof; means for supplying a lubricating fluid to the inner surfaces of the hopper walls; means for continuously rotating said flight in such direction as to move the fatty material toward said pump inlet passage, whereby when the valve means controlling such passage is closed the flight will tend to disintegrate, deaerate and emulsify the fatty material, and when such valve means is open will force such material in a compacted mass through said passage to the working chamber of the pump; and a closed conduit connected to the outlet passage of the pump for conducting the material therefrom to the second mentioned work station in a continuous confined stream.

10. Apparatus for pressurally transferring slabs, strips and smaller pieces of animal fat material in a continuous confined stream from one work station of a meat processing plant to another work station substantially spatially separated from the first mentioned station, said apparatus comprising a pump disposed at the first mentioned work station and having a working chamber, a pressure member operable therein, inlet and outlet passages communicating with said chamber, and positively actuated completely closing valve means controlling said passages; an inverted conical hopper surmounting said pump for continuously receiving the pieces of fatty material, the lower end of said hopper communicating with said inlet passage of the pump; a helical flight of less diameter than the hopper rotatably mounted in the latter co-axially thereof; means for continuously rotating said flight in such direction as to move the fatty material toward said pump inlet passage, whereby when the valve means controlling such passage is closed the flight will tend to disintegrate and deaerate the fatty material, and when such valve means is open will force said material in a compacted mass through said passage to the working chamber of the pump, the closing movements of said valve means also contributing to the disintegration of the material; a fixed blade disposed in the hopper intermediate its wall and said flight, for preventing mass rotation of the material in the hopper, and assisting in the disintegration and feeding of the material to the pump inlet passage; a closed conduit connected to the outlet passage of the pump for conducting the material therefrom to the second mentioned work station in a continuous confined stream; and a heating coil surrounding said conduit.

11. Apparatus for pressurally feeding slabs, strips and smaller pieces of animal fat material to the intake of a pressure pump for pipe-line transfer thereby to a distant point, said apparatus comprising a downwardly convergent hopper for continuously receiving the pieces of fatty material, said hopper having an unobstructed discharge port at its lower end for communication with the inlet passage of the pump; means for continuously working the pieces of fatty material in the hopper to partially disintegrate them, deaerate the mass, and pressurally feed it through said port, comprising a helical flight mounted in the hopper for rotation about a vertical axis, said flight being of smaller diameter than the hopper and disposed with its lower end adjacent the port; and continuously operating means carried by the hopper and connected to said helical flight for rotating the latter in a direction to move the material toward and through the port.

12. Apparatus for pressurally feeding slabs, strips and smaller pieces of animal fat material to the intake of a pressure pump for pipe-line transfer thereby to a distant point, said apparatus comprising an inverted conical hopper for continuously receiving the pieces of raw fatty material, said hopper having an unobstructed discharge port at its lower end adapted to communicate with the inlet passage of the pump; means for continuously pressurally working said pieces of material in the hopper to partially disintegrate them, deaerate the mass, and force it through said port, comprising a vertically disposed helical flight rotatably mounted in the hopper, said flight being of smaller diameter than the hopper and terminating adjacent the port; continuously operating means carried by the hopper and connected to said flight for rotating it in a direction to move the material to and through the port; and a substantially vertical blade mounted in the hopper intermediate its wall and said flight, for preventing mass rotation of the material in the hopper under the action of the flight.

13. Apparatus for pressurally feeding slabs, strips and smaller pieces of raw animal fat material to the intake of a pressure pump for pipe-line transfer thereby to a distant point, said apparatus comprising an open-topped downwardly convergent hopper for continuously receiving the pieces of fatty material, said hopper having a discharge port at its smaller end adapted to communicate with the inlet passage of the pump; means for continuously pressurally working said pieces of material in the hopper to partially disintegrate them, deaerate the mass, and force it through said port, comprising a vertically disposed helical flight rotatably mounted in the hopper co-axially thereof and terminating adjacent the port; continuously operating means carried by the hopper and connected to the flight for rotating the latter in a direction to move the material to and through the port; and a spray pipe disposed in the upper part of the hopper, for discharging a lubricating fluid on the inner surfaces of the hopper walls.

References Cited in the file of this patent

UNITED STATES PATENTS

| Number | Name | Date |
|---|---|---|
| 962,118 | Bradley | June 21, 1910 |
| 2,062,200 | Ball | Nov. 24, 1936 |
| 2,206,613 | Londais | July 2, 1940 |
| 2,399,153 | Wormeck et al. | Apr. 23, 1946 |
| 2,551,042 | Nyrop | May 1, 1951 |

FOREIGN PATENTS

| Number | Country | Date |
|---|---|---|
| 597,946 | Germany | June 5, 1934 |
| 52,843 | Holland | July 15, 1942 |